(12) United States Patent
Walsh et al.

(10) Patent No.: US 6,843,349 B2
(45) Date of Patent: Jan. 18, 2005

(54) TROLLEY WHEEL MECHANISM

(75) Inventors: Thomas Donal Walsh, County Meath (IE); Patrick Tierney, Dublin (IE)

(73) Assignee: Arrow Technology Systems Limited, Dublin (IE)

( * ) Notice: Subject to any disclaimer, the term of this patent is extended or adjusted under 35 U.S.C. 154(b) by 0 days.

(21) Appl. No.: 10/440,164

(22) Filed: May 19, 2003

(65) Prior Publication Data

US 2004/0011597 A1 Jan. 22, 2004

Related U.S. Application Data

(63) Continuation of application No. PCT/IE01/00146, filed on Nov. 21, 2001.

(30) Foreign Application Priority Data

Nov. 21, 2000 (IE) .......................................... 2000/0949
Apr. 9, 2001 (IE) .......................................... S2001/0347

(51) Int. Cl.[7] ............................................ B60B 33/00
(52) U.S. Cl. .......................... 188/1.12; 188/20; 188/68; 280/86; 16/35 R
(58) Field of Search ............................ 188/1.12, 9, 17, 188/20, 31, 68; 280/86, 86.1; 16/18 R, 35 R

(56) References Cited

U.S. PATENT DOCUMENTS

| | | | | |
|---|---|---|---|---|
| 4,414,702 A | * | 11/1983 | Neumann | 16/35 R |
| 4,677,706 A | * | 7/1987 | Screen | 16/35 R |
| 4,722,114 A | * | 2/1988 | Neumann | 16/35 R |
| 4,815,161 A | * | 3/1989 | Timmer et al. | 16/35 R |
| 5,014,391 A | * | 5/1991 | Schulte | 16/35 R |
| 5,303,450 A | * | 4/1994 | Lange | 16/35 D |
| 5,377,372 A | * | 1/1995 | Rudolf et al. | 5/600 |
| 5,450,639 A | * | 9/1995 | Weismiller et al. | 5/600 |
| 5,503,416 A | * | 4/1996 | Aoki et al. | 280/79.11 |
| 5,579,871 A | | 12/1996 | Emmrich et al. | 188/19 |
| 6,321,878 B1 | * | 11/2001 | Mobley et al. | 188/1.12 |
| 6,575,052 B2 | * | 6/2003 | Toennesland et al. | 74/512 |
| 2002/0033307 A1 | * | 3/2002 | Mobley et al. | 188/1.12 |

FOREIGN PATENT DOCUMENTS

| | | | |
|---|---|---|---|
| DE | 3431073 A1 | | 3/1985 |
| DE | 3602916 | * | 6/1987 |
| EP | 0072491 A1 | | 2/1983 |
| EP | 394555 | * | 12/1989 |
| EP | 0618088 A2 | | 10/1994 |
| GB | 1010363 | | 11/1965 |
| GB | 1438530 | | 6/1976 |
| GB | 2055041 | * | 6/1979 |
| GB | 2061717 | * | 10/1979 |
| WO | WO 94/01292 | * | 1/1994 |
| WO | WO 02/42093 | * | 5/2002 |

* cited by examiner

*Primary Examiner*—Robert A. Siconolfi
*Assistant Examiner*—Devon Kramer
(74) *Attorney, Agent, or Firm*—Jacobson Holman PLLC

(57) ABSTRACT

A trolley wheel mechanism has two caster wheel assemblies each having a pair of wheels mounted on a rotatable housing. In a free mode the wheels are free to both rotate and to swivel. This is caused by the user pressing a release pedal. In a unidirectional mode a retainer lock engages a brake disc to prevent swivelling of the housing. This is caused by the user pressing both pedals simultaneously. A brake mode is caused by the user pressing the apply pedal.

15 Claims, 4 Drawing Sheets

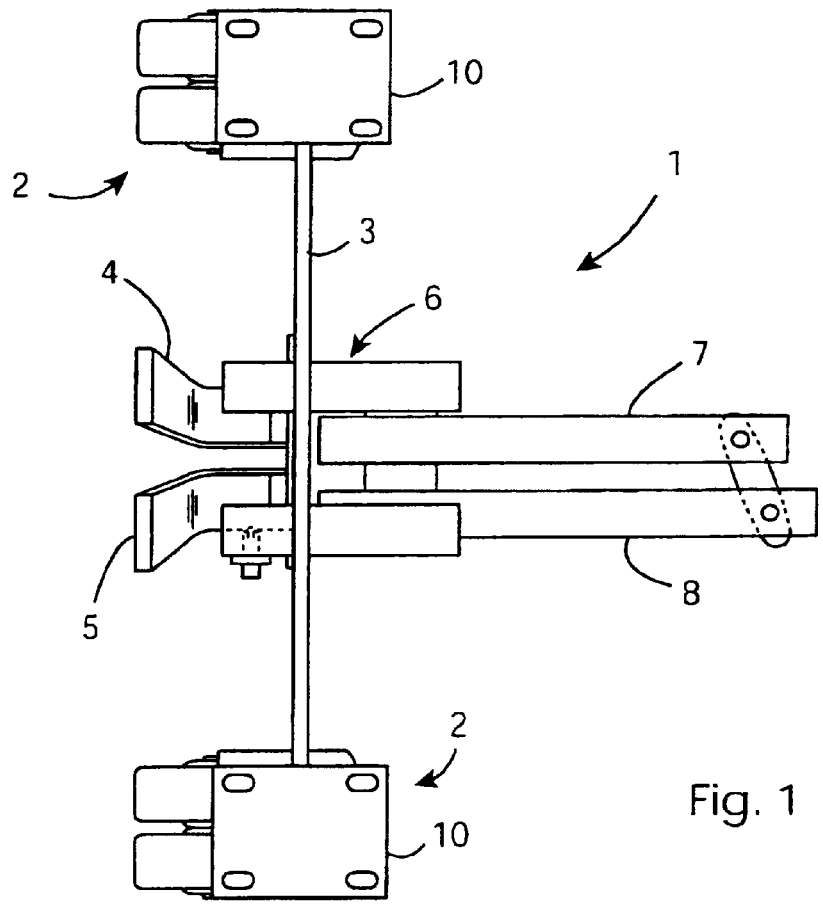
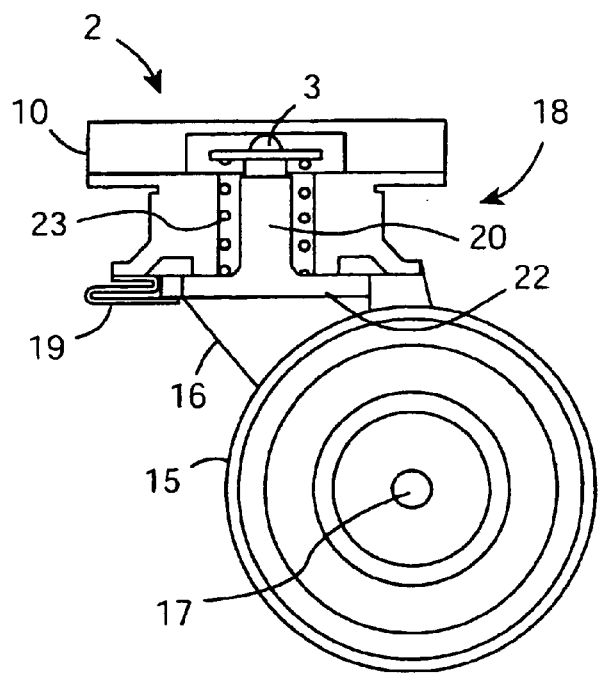
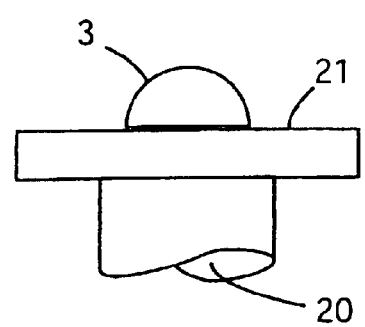
Fig. 1
Fig. 2

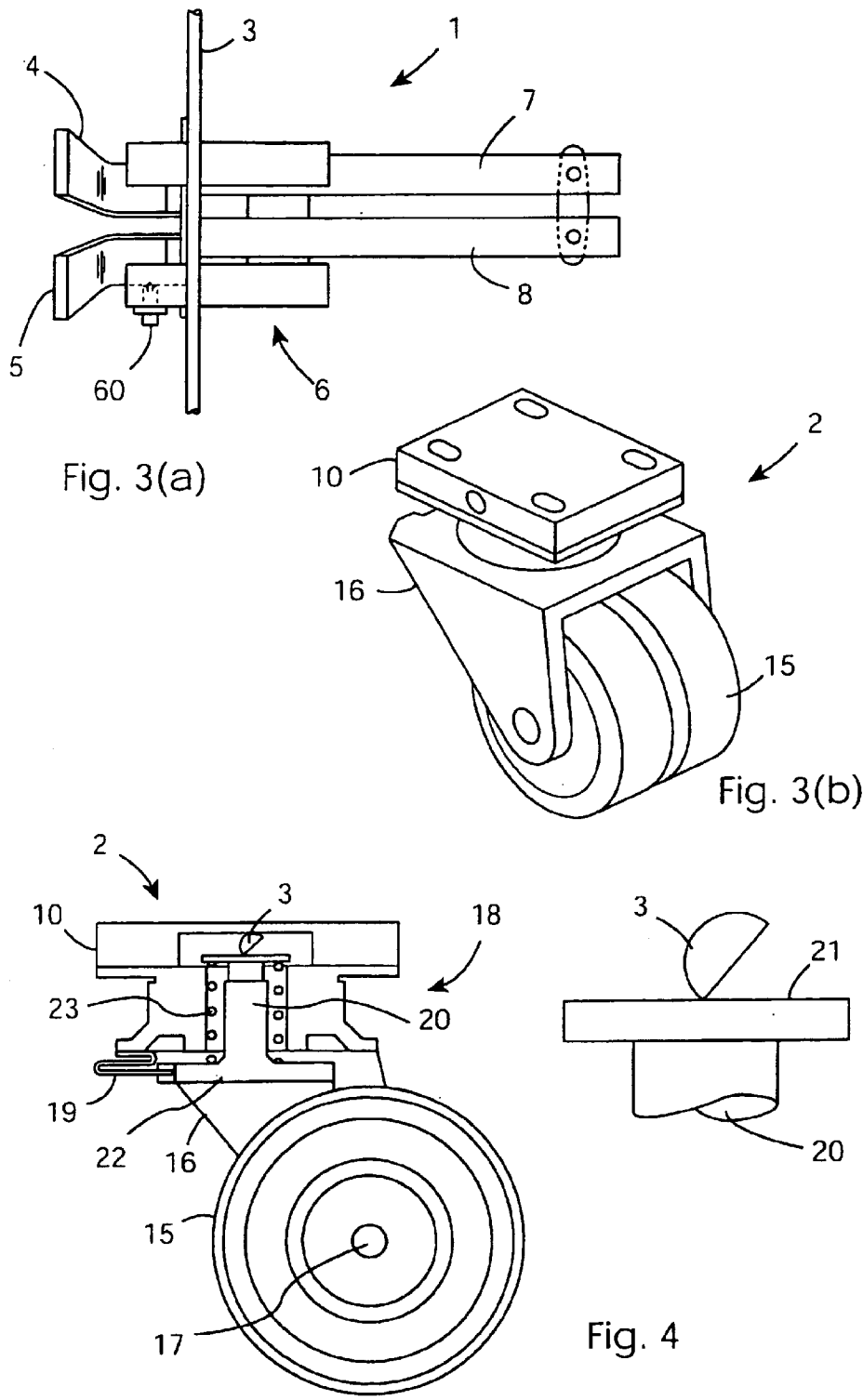

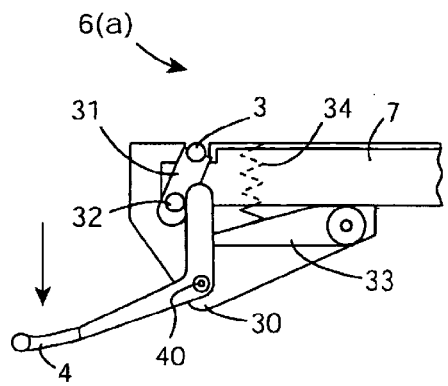
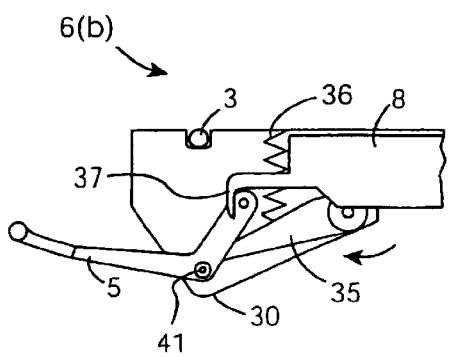
Fig. 7(a)
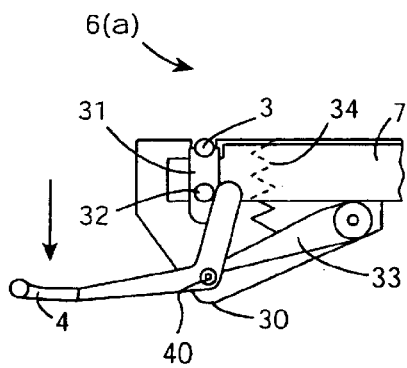
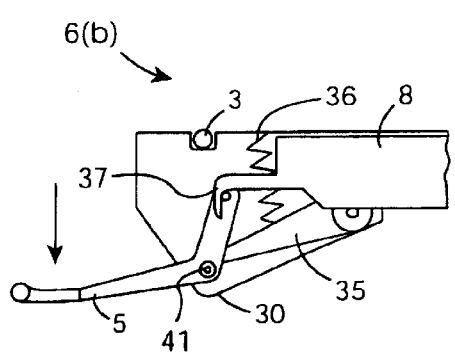
Fig. 7(b)
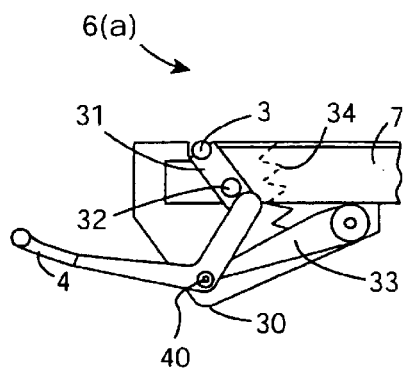
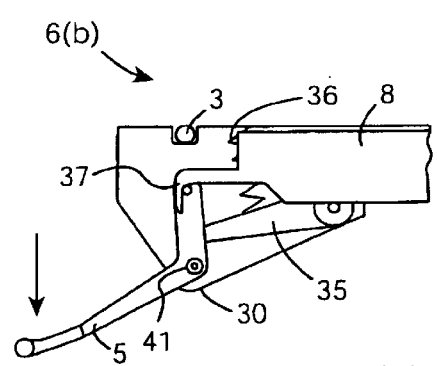
Fig. 7(c)

TROLLEY WHEEL MECHANISM

This is a continuation of PCT/IE01/00146 filed Nov. 21, 2001 and published in English.

FIELD OF THE INVENTION

The invention relates to trolleys, and more particularly to caster wheel mechanisms for trolleys.

PRIOR ART DISCUSSION

Caster wheels have been used for trolleys for many years. By virtue of their swivelling action they allow trolleys to be easily manoeuvred in confined spaces.

It is also known to provide a brake mechanism to prevent rotation of the wheels, and a lock mechanism to prevent swivelling of the wheels. British Patent Specification No. 1010363 describes such an arrangement. However, the action to prevent swivelling appears to lock the wheels at whichever swivel position they happen to be at. This is awkward for users. Also, little detail is disclosed about how the user operates the mechanisms.

British Patent Specification No. 1438530 describes a wheel mechanism in which a single handle is rotated through various angular positions for different modes of operation. It appears that a good deal of skill would be required to effectively use the handle and that it is likely to be accidently knocked into an undesired position.

OBJECTIVES OF THE INVENTION

The invention is directed towards providing for simpler and easier user control of a trolley. A related object is to reduce risk of injury, such as back pain, for users, by reducing the push and pull forces required for a trolley. An example is movement of a trolley into and out of a galley in an airplane or train

SUMMARY OF THE INVENTION

According to the invention, there is provided a trolley wheel mechanism comprising at least one caster wheel, a user actuator means, and means for applying a brake to the wheels according to user control of the actuator means, characterised in that, the mechanism further comprises means for retaining the wheel in an in-line position in a unidirectional mode in response to user control of the actuator means.

In one embodiment, the actuator means comprises an apply actuator and a release actuator, the braking means comprises means for applying a brake to the wheel in response to a user input with the apply actuator, and for releasing the brake in response to a user input with the release actuator, and wherein the retaining means comprises means for retaining the wheel in the unidirectional mode in response to user inputs with both actuators.

In another embodiment, the actuators are foot pedals.

In a further embodiment, the retaining means comprises means for entering the unidirectional model in response to simultaneous depression of both pedals.

In one embodiment, the retaining means comprises a retaining lock on a wheel support or a mechanism frame member, the retaining lock comprising means for engagement in a retaining position upon swivelling of the wheel to an in-line position in the unidirectional mode.

In another embodiment, the retaining lock is mounted for engagement between a rotatable support for the wheel and the brake.

In one embodiment, the brake comprises means for movement between three operative positions as follows:
a free position at which it is not applied to the wheel and it is not engaged with the retaining lock;
a unidirectional position at which it is not applied to the wheel but is in engagement with the retaining lock for the unidirectional mode; and
a braking position at which it is applied to the wheel.

In one embodiment, the retaining lock is resilient for snap-fitting engagement upon swivelling of the wheel to an in-line position when the mechanism is in the unidirectional mode.

In another embodiment, the mechanism comprises at least two caster wheels for use on laterally opposed sides of a trolley.

In one embodiment, the braking means and the retaining means comprise an element which is movable between free, unidirectional, and braking positions in response to the actuator means.

In another embodiment, the element supports a brake, and the braking position is at a lowermost location of the element.

In a further embodiment, the element engages with the retaining lock at its unidirectional position.

In one embodiment, the actuator means comprises a cam shaft mounted to move the element in response to user inputs.

In another embodiment, the mechanism further comprises an apply link means and a release link means interconnecting the release and apply actuators of the mechanism, and for connection with another mechanism.

In a further embodiment, said link means comprises means for causing the apply actuator to move to a home position in response to a user input with the release actuator, and for causing the release actuator to move to a home position in response to a user input with the apply actuator.

According to another aspect, the invention provides a trolley comprising a trolley body and at least one wheel mechanism as defined above.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:

FIG. 1 is a plan view of a wheel mechanism in a free mode (un-braked and unlocked), and FIG. 2 is a diagrammatic side view showing a wheel assembly for this mode and an enlarged view of connection between a cam and a plunger;

FIG. 3(a) is a plan view of the mechanism in an un-braked and retained position for a unidirectional mode, FIG. 3(b) is a perspective view of a wheel assembly, and FIG. 4 is a diagrammatic side view showing a wheel assembly for the unidirectional mode;

FIGS. 7(a) and 7(b), and 7(c) are diagrammatic side views illustrating a pedal mechanism of the wheel mechanism in the free, unidirectional, and braking modes respectively.

DESCRIPTION OF THE EMBODIMENTS

Figure 5:
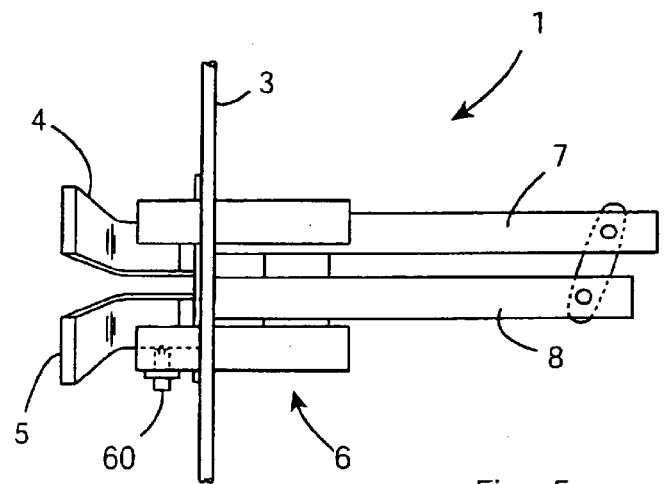
FIG. 5 is a plan view of the mechanism in a braking mode.

Referring to FIG. 1, a wheel mechanism 1 comprises a pair of wheel assemblies 2 interconnected by a cam shaft 3. The mechanism 1 also comprises a release pedal 4 and an apply pedal 5 connected to the cam shaft 3 to rotate it to three operative positions, described below. The connection to the cam shaft 3 is via a pedal mechanism 6. The pedal mechanism 6 is connected to link arms 7 and 8 to transfer pedal movements to another mechanism for the trolley, and vice versa. Also, the link arms 7 and 8 are interconnected as shown so that they transfer movement to each other. Each wheel assembly 2 comprises a base plate 10 for securing by bolts to the trolley (not shown).

Referring to FIG. 2 and FIG. 3(b), each wheel assembly 2 comprises a pair of side-by-side wheels 15, and an inverted U-shaped bracket 16 supporting an axle 17 for the wheels 15. The bracket 16 is part of a rotatable housing 18 supporting a resilient retainer lock 19 (which rotates with the housing).

The base plate 10 supports a plunger 20, the upper end of which has a face 21 engaging the cam 3. The lower end of the plunger 21 is integral with a brake disc 22 for direct engagement with the wheels 15. The plunger 20 is keyed on a central sleeve secured to the base plate 10, and so does not rotate. Its only movement is translationally up and down. This movement is biassed upwardly by a helical spring 23. The brake disc 22 includes a notch which is in registry with the resilient lock 19 when the wheels 15 are in an in-line (straight-ahead) position.

In use, as shown in FIGS. 1 and 2 the wheel assemblies have a free mode at which the wheels are not braked and the housing 18 and wheels 15 are free to swivel through 360°. This mode is achieved after pressing the release pedal 4, causing the cam shaft 3 to rotate so that its face faces the plunger 20, allowing the plunger 20 to reach its highest position. As is clear from FIG. 2 the brake disc 22 is not in engagement with the wheels 15 and is not in engagement with the retainer lock 19.

Referring to FIGS. 3 and 4 a unidirectional mode is shown. This is achieved by the user pressing both of the pedals 4 and 5 simultaneously, causing the cam shaft 3 to rotate through 45°. This rotation pushes the plunger 20 downwardly against bias of the spring 23 to an intermediate position. At this position the brake disc 22 is still not in contact with the wheels 15, however its notch is in engagement with the retainer lock 19. If the two pedals 4 and 5 are pressed simultaneously when the wheels 15 are not in-line, as soon as the trolley is pushed they would swivel to the inline position and the notch would engage with the retainer lock 19 due to resilience of the lock 19.

In the unidirectional mode all wheels of the mechanism 1 and any mechanism interlinked by the arms 7 and 8 are retained in the in-line position. This makes it very easy for an operator to push or pull the trolley in a straight-ahead path. Thus, it is particularly convenient for aircraft use because of the narrow aisles.

Figure 6:
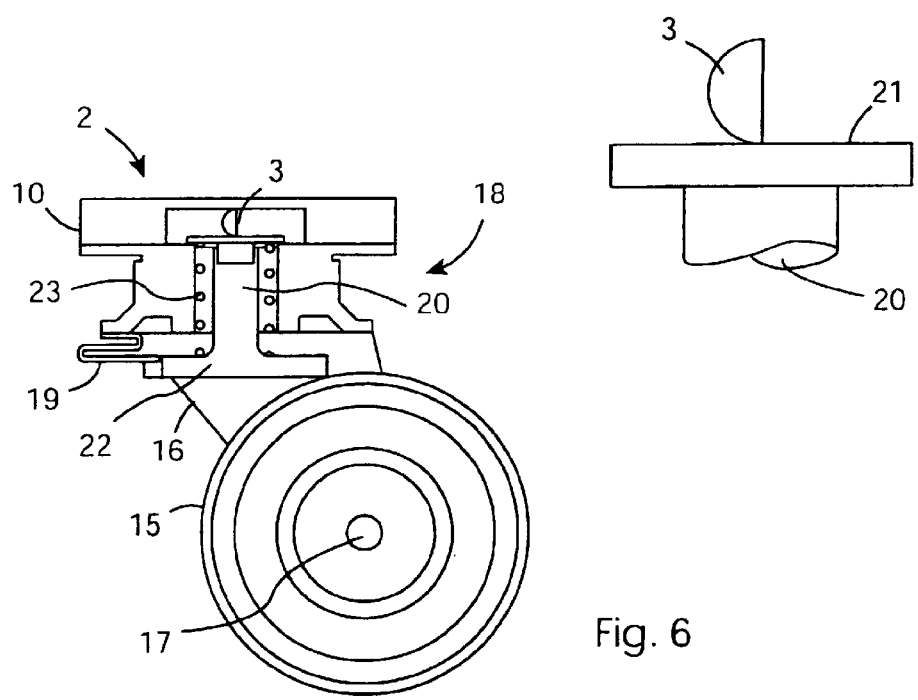
FIG. 6 is a diagrammatic side view showing a wheel assembly for this mode.

Referring to FIGS. 5 and 6, a braking mode is illustrated. This is reached by the user pressing the brake apply pedal 5, rotating the cam shaft 3 through 90° with respect to the free mode. This urges the plunger 20 to its lowermost position, at which the brake disc 22 is in contact with the wheels, and the retainer lock 19 is in engagement In this position there is neither swivelling or rotation of the wheels 15.

The following summarises the overall operation of an aircraft trolley (cart) having a mechanism 1 at each end. In this summary, the release pedal 4 is coloured green and the apply pedal 5 is coloured red.

Operator presses down both green and red pedals together and either pushes or pulls the cart in the aisle or into the galley space.

All the casters are aligned simultaneously irrespective of wheel position and are held in the unidirectional mode.

To release the cart from this mode press down the green pedal to home position (multidirectional). This is required when turning out of or into the galley.

To re-establish the unidirectional mode press down both red and green pedals simultaneously.

Press down the red pedal to apply brake.

Just before the cart is about to be stored in the galley press both red and green pedals together. This will align casters in unidirectional mode. Then press red pedal when cart is stored.

When removing cart from storage press both green and red pedals together, after removal press the green pedal. This is required when turning out of or into the galley.

Referring to FIGS. 7(a), 7(b) and 7(c) the pedal mechanism 6 is shown in more detail. A release part 6(a) of the mechanism 6 is operated by the release pedal 4, and an apply part 6(b) of the mechanism 6 is operated by the apply pedal 5. The pedal mechanism 6 as a whole comprises a frame 30, and the cam shaft 3 passes through it.

The release part 6(a) comprises a drive arm 31 welded to the cam shaft 3 at its inner end, and having a pin 32 at its outer end. The pin 32 is engaged with the link arm 7, and an inner end of the release pedal 4 abuts against it. Rotation of the release pedal 4 is biased in the anti-clockwise direction about a pivot pin 40 by a nylon bias arm 33. The nylon bias arm 33 is in turn biased in the clockwise direction by a helical spring 34 anchored on the frame 30.

The apply part 6(b) of the pedal mechanism 6 is not directly connected to the cam shaft 3. Rotation of the apply pedal 5 about a pivot pin 41 is biased in the anti-clockwise direction by a nylon bias arm 35, itself biased in the clockwise direction by a helical spring 36.

The free mode is caused by the user pressing the release pedal 4, and the apply pedal 5 is not moved. This is illustrated in FIG. 7(a). Pressing the release pedal 4 causes two movements as follows:

(a) rotation of the cam shaft 3 by abutment of the release pedal 4 with the drive arm 31 (at the pin 32), and (b) movement of the link arm 7, in turn causing the apply pedal 5 to move to a home position, and causing the other mechanism 1 at the other end of the trolley to enter the free mode.

The unidirectional mode is caused by the user pressing both pedals 4 and 5 simultaneously. This action brings the two pedal mechanism parts 6(a) and 6(b) to an intermediate position as shown in FIG. 7(b). The pressing actions cause corresponding movements in the pedals 4 and 5 of the other mechanism 1 via the links 7 and 8.

The braking mode is shown in FIG. 7(c). In this case the apply pedal 5 is pressed. This pulls the rod 8 to the left as viewed in FIG. 7(c), in turn causing the release pedal 4 to rotate as shown in FIG. 7(c).

Interconnection by way of the link arms 7 and 8 causes the following sequence for near ("N") and far ("F") pedals of mechanisms 1 at opposite ends of the trolley.

Press near apply pedal 5 down to enter the braking mode (FIG. 7(c)).

Near release pedal 4 goes up.

Far release pedal 4 goes up.

Far apply pedal 5 goes down.

The opposite is the case upon pressing the release pedal 4 for the free mode (FIG. 7(a)):

Press near release pedal 4 down.

Near apply pedal 5 goes up.

Far apply pedal 5 goes up.

Far release pedal 4 goes down.

As shown in FIGS. 1, 3(a), and 5 there is a spring-loaded ball catch 60 which is located for snap-fitting engagement with the apply pedal 5 in the unidirectional mode. This adds to stability of all pedals because of their interconnections. There is no need for such a catch for the free or braking modes because the pedal positions are very stable for these modes.

It will be appreciated that the invention provides for very simple and effective control. Only two pedals are required to provide the three modes of operation. The mechanism is also very compact. Another advantage is that it is of simple and robust construction.

It has been found that forces necessary to move an aircraft trolley in an out of a galley are considerably reduced if the control methodology set out in the example above is used. Because the operator can achieve all control with his or her feet and because of the reduced pushing and pulling forces there is a reduced risk of cumulative strain on operators. There is also less risk of accidentally bumping of objects or people.

The invention is not limited to the embodiments described but may be varied in construction and detail.

What is claimed is:

1. A trolley wheel mechanism comprising
   at least one caster wheel,
   a user actuator,
   a brake mechanism for applying a brake to the at least one castor wheel according to user control of the user actuator, and
   a retainer mechanism for retaining the at least one castor wheel in an in-line position in response to user control of the user actuator,
   the user actuator comprises an apply actuator and a release actuator, the apply actuator and the release actuator being movable independent of each other,
   the brake mechanism applying a brake to the at least one castor wheel in response to a user input on only the apply actuator and releasing the brake in response to a user input on only the release actuator,
   the retainer mechanism retaining the at least one castor wheel in the in-line position in response to simultaneous user inputs on both the apply actuator and the release actuator.

2. The trolley wheel mechanism as claimed in claim 1, wherein the apply actuator and the release actuator are separate foot pedals.

3. The trolley wheel mechanism as claimed in claim 1, wherein the retainer mechanism comprises a retaining lock on a wheel support or a mechanism frame member, the retaining lock comprises a lock mechanism for engagement in a retaining position upon swiveling of the at least one castor wheel to an in-line position.

4. The trolley wheel mechanism as claimed in claim 3, wherein the retaining lock is mounted for engagement between a rotatable support for the at least one castor wheel and the brake.

5. The trolley wheel mechanism as claimed in claim 4, wherein the brake is movable between three operative positions as follows:
   a free position at which the brake is not applied to the at least one castor wheel and the brake is not engaged with the retaining lock in a free mode;
   a unidirectional position at which the brake is not applied to the at least one castor wheel but is in engagement with the retaining lock in a unidirectional mode; and
   a braking position at which the brake is applied to the wheel in a braking mode.

6. The trolley wheel mechanism as claimed in claim 3, wherein the retaining lock is resilient for snap-fitting engagement upon swivelling of the at least one castor wheel to an in-line position when the mechanism is in the unidirectional mode.

7. The trolley wheel mechanism as claimed in claim 1, further comprising at least two caster wheels for use on laterally opposed sides of a trolley.

8. The trolley wheel mechanism as claimed in claim 5, wherein the brake mechanism and the retainer mechanism comprise an element which is movable between free, unidirectional, and braking positions in response to the user actuator.

9. The trolley wheel mechanism as claimed in claim 8, wherein the element supports a brake, and the braking position is at a lowermost location of the element.

10. The trolley wheel mechanism as claimed in claim 8, wherein the element engages with the retaining lock at the unidirectional position.

11. The trolley wheel mechanism as claimed in claim 8, wherein the user actuator comprises a cam shaft mounted to move the element in response to user inputs.

12. The trolley wheel mechanism as claimed in claim 1, further comprising an apply link and a release link interconnecting the release and apply actuators, and for connection with another trolley wheel mechanism.

13. The trolley wheel mechanism as claimed in claim 12, wherein said links cause the apply actuator to move to a home position in response to a user input with the release actuator, and cause the release actuator to move to a home position in response to a user input with the apply actuator.

14. The trolley comprising a trolley body and at least one wheel mechanism as claimed in claim 1.

15. A trolley mechanism comprising
    at least one caster wheel,
    a user actuator,
    a brake mechanism for applying a brake to the at least one castor wheel according to user control of the user actuator,
    a retainer mechanism for retaining the at least one castor wheel in an in-line position in response to the user control of the user actuator,
    the user actuator comprises an apply actuator and a release actuator, the apply actuator and the release actuator being movable independent of each other,
    the brake mechanism applies a brake to the at least one castor wheel in response to a user input on the apply actuator and releases the brake in response to a user input on the release actuator,
    the retainer mechanism retaining the at least one castor wheel in the in-line position in response to simultaneous user inputs on both the apply actuator and the release actuator, the retainer mechanism and the brake mechanism provide three modes as follows:
 a free mode in which at least one castor the wheel is not braked and the at least one castor wheel is free to swivel,
 a undirectional mode in which the at least one castor wheel is retained in the in-line position but is not braked, and
 a braking mode in which the at least one castor wheel is retained in the in-line position and is braked; and
wherein the retainer mechanism and the brake mechanism directly change between the undirectional mode and the braking mode, the at least one castor wheel being retained in the in-line position during the transition.

* * * * *